United States Patent
Morrissey et al.

(10) Patent No.: US 6,841,944 B2
(45) Date of Patent: Jan. 11, 2005

(54) LUMINAIRE DIAGNOSTIC AND CONFIGURATION IDENTIFICATION SYSTEM

(75) Inventors: Joseph F. Morrissey, Rockland, MA (US); Martin W. Liben, Hull, MA (US); Thomas A. Murphy, South Darmouth, MA (US)

(73) Assignee: Acuity Brands, Inc., Atlanta, GA (US)

( * ) Notice: Subject to any disclaimer, the term of this patent is extended or adjusted under 35 U.S.C. 154(b) by 0 days.

(21) Appl. No.: 10/362,823
(22) PCT Filed: Aug. 22, 2001
(86) PCT No.: PCT/US01/26271
§ 371 (c)(1), (2), (4) Date: Feb. 24, 2003
(87) PCT Pub. No.: WO02/17691
PCT Pub. Date: Feb. 28, 2002

(65) Prior Publication Data
US 2004/0124786 A1 Jul. 1, 2004

Related U.S. Application Data

(60) Provisional application No. 60/227,089, filed on Aug. 22, 2000.
(51) Int. Cl.[7] .............................. H01J 7/24; G05F 1/00
(52) U.S. Cl. ......................................... 315/119; 315/308
(58) Field of Search ................................ 315/119, 115, 315/150, 307, 291, 308

(56) References Cited

U.S. PATENT DOCUMENTS

| 5,103,137 A | 4/1992 | Blake et al. |
|---|---|---|
| 5,235,252 A | 8/1993 | Blake |
| 5,828,178 A | 10/1998 | York et al. |
| 5,895,986 A * | 4/1999 | Walters et al. ............... 307/117 |
| 6,028,396 A * | 2/2000 | Morrissey et al. ........... 315/119 |
| 6,087,776 A * | 7/2000 | Yamashita et al. ............ 315/82 |
| 6,452,339 B1 * | 9/2002 | Morrissey et al. ........... 315/149 |
| 6,452,340 B1 | 9/2002 | Morrissey, Jr. et al. |
| 6,495,973 B1 * | 12/2002 | Allen, Jr. ..................... 315/302 |
| 6,542,340 B1 * | 4/2003 | Hayashi ....................... 360/322 |

OTHER PUBLICATIONS

International Search Report in related PCT/US01/26271 (Nov. 16, 2001).

* cited by examiner

Primary Examiner—James Vannucci
Assistant Examiner—Minh Dieu A
(74) Attorney, Agent, or Firm—John S. Pratt; Geoffrey K. Gavin; Kilpatrick Stockton LLP

(57) ABSTRACT

A diagnostic and configuration identification system for an electrical device and a Photo-controller which automatically turns the electrical device on and off in response to ambient light levels. A detector senses the load drawn by the electrical device when it is on. A processor is responsive to the load drawn by the electrical device when it is on and programmed to detect a cycling fault condition based on the load drawn by the electrical device and to provide an indication of a cycling fault condition according several possible programming configurations. When no cycling or other fault condition is detected the processor determines the cycling fault condition indication configuration and then outputs a cycling signal indicative of the program configuration.

49 Claims, 9 Drawing Sheets

LUMINAIRE DIAGNOSTIC AND CONFIGURATION IDENTIFICATION SYSTEM

RELATED APPLICATIONS

This application claims priority to U.S. Provisional Application No. 60/227,089 filed Aug. 22, 2000, and to International Application No. PCT US01/26271, filed Aug. 22, 2001.

FIELD OF THE INVENTION

This invention relates to a photocontroller with a microprocessor programmed to quickly detect a fault condition based on the load drawn by the lamp and which provides a positive indication when no fault is detected in a way that also informs quality assurance personnel which fault indication configuration is resident on the microprocessor.

BACKGROUND OF THE INVENTION

Photocontrollers are typically mounted on street lights and operate to turn the light off during the day and on at night. Since the cost of servicing a single street light can cost $100 or more on busy roads and in busy areas, and since there are 60,000,000 street lights in the United States alone, the problem of servicing faulty photocontrollers is severe. For example, when the relay of the photocontroller fails, or when the photocell fails, the street light will remain on during periods of daylight thereby wasting electricity. Alternatively, a faulty relay or a faulty photocell could cause the lamp to remain off during the night causing a safety hazard. Since repair typically occurs during daylight hours, it is often difficult to detect the latter condition.

The problem of high pressure sodium (HPS) street lights cycling at the end of their useful life is also severe. The phenomena of cycling of HPS lamps as they age from use is caused by some of the electrode material being plated off the electrodes and then being deposited on the inside of the arc tube. This makes the tube darken and traps more heat inside the arc tube. As a result, an increased voltage is required to keep the lamp ignited or ionized. When the voltage limit of the ballast is reached, the lamp extinguishes by ceasing to ionize. Then, the lamp must cool down for several minutes before an attempt at re-ignition can be made. The result is "cycling" wherein the worn out lamp keeps trying to stay lighted. The voltage limit is reached, the lamp extinguishes, and then after an approximately one-two minute cool down period, the arc tube re-ignites and the light output increases again and until the voltage limit is reached whereupon the lamp again extinguishes.

Cycling may waste electricity, cause RFI (radio frequency interference) which adversely effects communication circuits, radios, and televisions in the area, and may adversely effect and prematurely wear out the ballast, starter, and photocontroller.

For example, if an HPS lamp undergoes cycling for a many nights before it is finally serviced and replaced, the ballast or starter can be damaged or degraded. But, when the HPS lamp is replaced, this damage or degradation might not be detected. Later service calls then must be made to service these problems. The ballast and starter components are more expensive than the lamp or the photocontroller.

The cycling problem is well documented but, so far, the only solutions offered are to replace the HPS lamps with less efficient mercury lamps or to reconfigure existing photocontrollers with a special fiber optic sensor which senses light from the lamp and sends a signal to a microprocessor to indicate whether the lamp is on or off. After three on/off cycles, the microprocessor turns the lamp off and turns on a red strobe light which can be seen from the street. Unfortunately, this prior art solution requires modifications to the existing light fixture (e.g. a hole must be drilled in the fixture housing) and the use of an expensive fiber optic sensor. See, e.g., U.S. Pat. Nos. 5,235,252 and 5,103,137 both incorporated herein by this reference.

Another problem with all luminaries including HPS or other types of lamps is the cost involved in correcting the cycling problem and other faults such as a lamp out condition. For example, a resident may report a lamp out or a cycling condition but when the repair personnel arrives several hours later, the lamp may have cycled back on. Considering the fact that the lamp pole may be 25–35 ft high, repair personnel can waste a considerable amount of time checking each lamp in the area. Also, repair and maintenance personnel may not be able to service a given residential area until daylight hours when all of the street lights are off by design.

In U.S. Pat. No. 6,028,396 (also incorporated herein by this reference), the photocontroller includes a microprocessor programmed to detect whether the lamp to which it is attached is faulty, i.e., either out or cycling. When the lamp is turned on, the load drawn by the lamp is read by the microprocessor at times $t_1$ and $t_2$ and the load difference is calculated. If the load difference is less than about 12.5%, the lamp is determined to be out because a properly working lamp consistently draws more and more of a load during a start-up condition while a failed lamp or ballast does not.

Furthermore, by continuing to read the loads at times $t_3- \ldots t_n$ and counting the number of times the load reading at any two readings is lower than about 25% provides an indication of a cycling event.

In co-pending applications Ser. No. 09/544,307, a faulty relay condition is detected when the lamp draws a load even when it is off. A faulty photocell condition is detected when the lamp continuously draws a load (and is thus on) even when it is daytime.

In each case, the microprocessor outputs a fault detection signal and causes one or more indication events to occur. The photocontroller so programed has performed well and has been well received in the industry. Different customers, however, desire different ways of providing an indication of when a fault event is detected.

For example, some customers, when a cycling fault is detected, want the light turned off immediately and an LED resident on the photocontroller to flash. Accordingly, this option is programmed into the microprocessor as "option A."

Different customers, when a cycling event is detected, want the light to remain on even in the daytime so it can be readily seen by repairmen. This "cycling day burner" option is programmed as "option B."

Still other customers, when a cycling fault is detected, ask that the light be turned off and kept off always thereafter. This is programming "option C."

One interesting concern that has occurred when different photocontrollers were programmed according to these different options is that quality assurance inspectors have a difficult time insuring at the factory that the correct programming option is resident in the photocontrollers. Still another interesting problem uncovered by the inventors hereof was that a fault signal was only provided when there was a fault, i.e., there was no way to quickly and positively ascertain whether the photocontrol was operating properly since there was no positive indication when the photocontrol during testing performed correctly. Moreover, it takes some time for the transients to settle and the lamp to warm up during factory testing adding to the cost of and the time consumed by final product testing.

SUMMARY OF THE INVENTION

It is therefore an object of this invention to provide a luminaire diagnostic and configuration identification system.

It is a further object of this invention to provide such a system which is easier and faster to inspect.

It is a further object of this invention to provide such a system which outputs a positive indication when no fault is detected in the photocontrol.

It is a further object of this invention to provide such a system which provides a positive indication to quality assurance personnel regarding the particular microprocessor configuration resident in the photocontroller.

This invention results from the realization that a faster and easier to inspect photocontrol can be effected by programing the microprocessor of the photocontrol to quickly detect a fault condition based on the load drawn by the lamp and then to provide a positive indication when no fault is detected in a way that also informs quality assurance personnel which fault indication program version is resident on the microprocessor of the photocontrol under test.

This invention features a diagnostic and configuration identification system comprising an electrical device, a photocontroller for automatically turning the electrical device on and off in response to ambient light levels, a detector for sensing the load drawn by the electrical device when it is on, and a processor responsive to the load drawn by the electrical device when it is on and programmed to detect a fault condition based on the load drawn by the electrical device and to provide an indication of said fault condition according to one of a plurality of configurations. When no fault condition is detected, the processor determines the fault condition configuration and then outputs a signal indicative of the indicated configuration.

Typically, each configuration is uniquely identified and the processor reads the identity to determine the appropriate configuration. In one example, one configuration includes a routine which turns the electrical device off when a fault condition is detected. In this embodiment, the photocontroller also includes a light (e.g., a LED) turned on by the processor when a fault condition is detected. In the preferred embodiment, this is a cycling fault. Another configuration includes a routine which permanently turns the electrical device on when a fault condition is detected. Still another configuration includes a routine which permanently turns the electrical device off when a fault condition is detected. Both of these fault configurations are typically also representative of cycling faults.

The fault condition programing for factory testing determines whether the load drawn by the electrical device is greater than a predetermined threshold when the electrical device is on and also determines whether the load drawn by the electrical device when the electrical device is off is less than the predetermined threshold. The processor then outputs a signal indicative of the identified configuration only when both the load drawn by the electrical device is greater than a predetermined threshold when the electrical device is on and when the load drawn by the electrical device when the electrical device is off is less than a predetermined threshold.

The optimal lamp out fault condition programming further detects the load drawn by the electrical device when the electrical device is on at times $t_1$ and $t_2$, calculates the load difference, determines whether the load difference exceeds a predetermined threshold, and provides an indication of a lamp out fault condition according to one said configuration when the load difference exceeds the predetermined threshold. For cycling detection, the fault condition programming typically counts the number of times the load difference exceeds the predetermined threshold and provides an indication of a fault condition according to one configuration when the count exceeds a predetermined threshold.

The optimal relay fault condition programming further detects whether the load is drawn by the electrical device when it is off and provides an indication of a relay fault condition according to one configuration when a load is drawn by the electrical device when it is off. The optimal photosensor fault condition programming further detects whether the electrical device remains continuously on or off for greater a predetermined time threshold and provides an indication of a photosensor fault condition according to one configuration in response. In the preferred embodiment, the microprocessor and the detector are integral with the photocontroller and the electrical device is a street lamp.

In another example, the diagnostic and configuration identification system comprises an electrical device, a photocontroller for automatically turning the electrical device on and off in response to ambient light levels, and a processor programmed to detect a fault condition and provide an indication of fault condition according to one of a plurality of configurations, and, when no fault condition is detected, to output a signal indicative of the indicated configuration. Thus, a positive feedback is provided to quality assurance personnel that the photocontroller is operating properly. In the preferred embodiment, the processor is responsive to a detector for sensing the load drawn by the electrical device when it is on. Each configuration is typically uniquely identified and the processor reads the identity to determine the configuration and outputs a signal indicative of the configuration only when both the load drawn by the electrical device is greater than a predetermined threshold when the electrical device is on and when the load drawn by the electrical device when the electrical device is off is less than a predetermined threshold.

In the preferred embodiment, a photocontroller automatically turns a lamp on and off in response to ambient light levels. A detector senses the load drawn by the electrical device when it is on. A processor, inside the photocontroller or coupled thereto, is responsive to the load drawn by the electrical device when it is on. The processor is programmed to detect a fault condition based on the load drawn by the lamp by detecting whether the load drawn by the lamp is greater than a predetermined threshold when the lamp is on and whether the load drawn by the lamp when it is off is less than the predetermined threshold. The processor also provides an indication of a fault condition according to one of a plurality of configurations. When no fault condition is detected, the processor determines the configuration and then outputs a code indicative of the indicated configuration. Each configuration is uniquely identified and the processor reads the identity to determine the configuration. One configuration includes a routine which when a lamp cycling fault is detected, turns the lamp off. The photocontroller also includes a light turned on by the processor when this fault condition is detected. The is called programming "option A." Another possible configuration includes a routine which permanently turns the lamp on when a cycling fault condition is detected. This is called programming "option B." Still another configuration includes a routine which permanently turns the lamp off when a cycling fault condition is detected. This is called programming "option C." A cycling fault is determined by counting the number of times the load difference exceeds a predetermined threshold and the processor provides an indication of a cycling fault condition according to one of the programming configurations when the count exceeds the predetermined threshold.

The processor is also programmed to determine whether the load drawn by the lamp is greater than a predetermined threshold when the lamp is on and to determine whether the load drawn by the lamp when the lamp is off is less than the predetermined threshold. The processor then outputs a code indicative of the cycling fault indication configuration only when both the load drawn by the lamp during testing is greater than a predetermined threshold when the lamp is on and when the load drawn by the lamp when the lamp is off is less than a predetermined threshold. The code is typically the Morse code for options A, B, or C which then informs quality assurance personnel which programming option is resident on the photocontrol under test.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
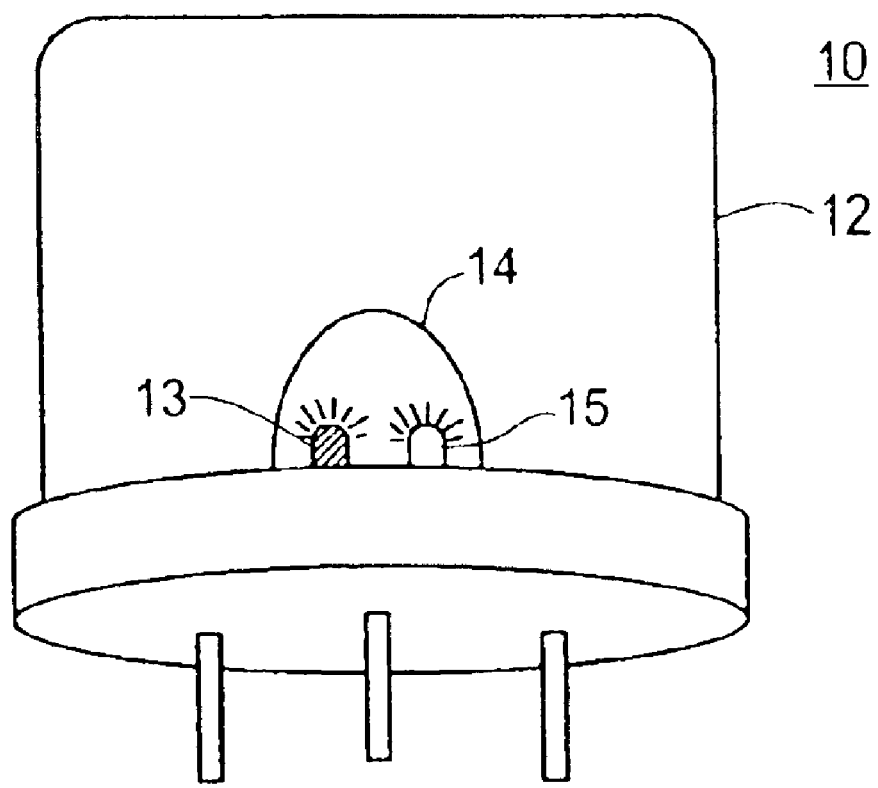
FIG. 1 is a schematic view of a photocontroller including the luminaire diagnostic and configuration and identification system of the subject invention.

Photocontrol device 10, FIG. 1 includes thermoplastic, high impact resistant, ultraviolet stabilized polypropylene cover 12 and clear window 14 made from UV stabilized, UV absorbing acrylic for the light sensor which resides on a circuit board within cover 12. Photocontrol device 10 is typically configured to fit an ANSI C136.10 receptacle but may be mounted in an ANSI C136.24 "button" package or other enclosure. Photocontroller 10 is typically mounted on a street light at the top of a light pole. Photocontroller 10 may also be used, however, in conjunction with other types of luminaries and other devices such as golf course water fountains and billboards.

Figure 2:
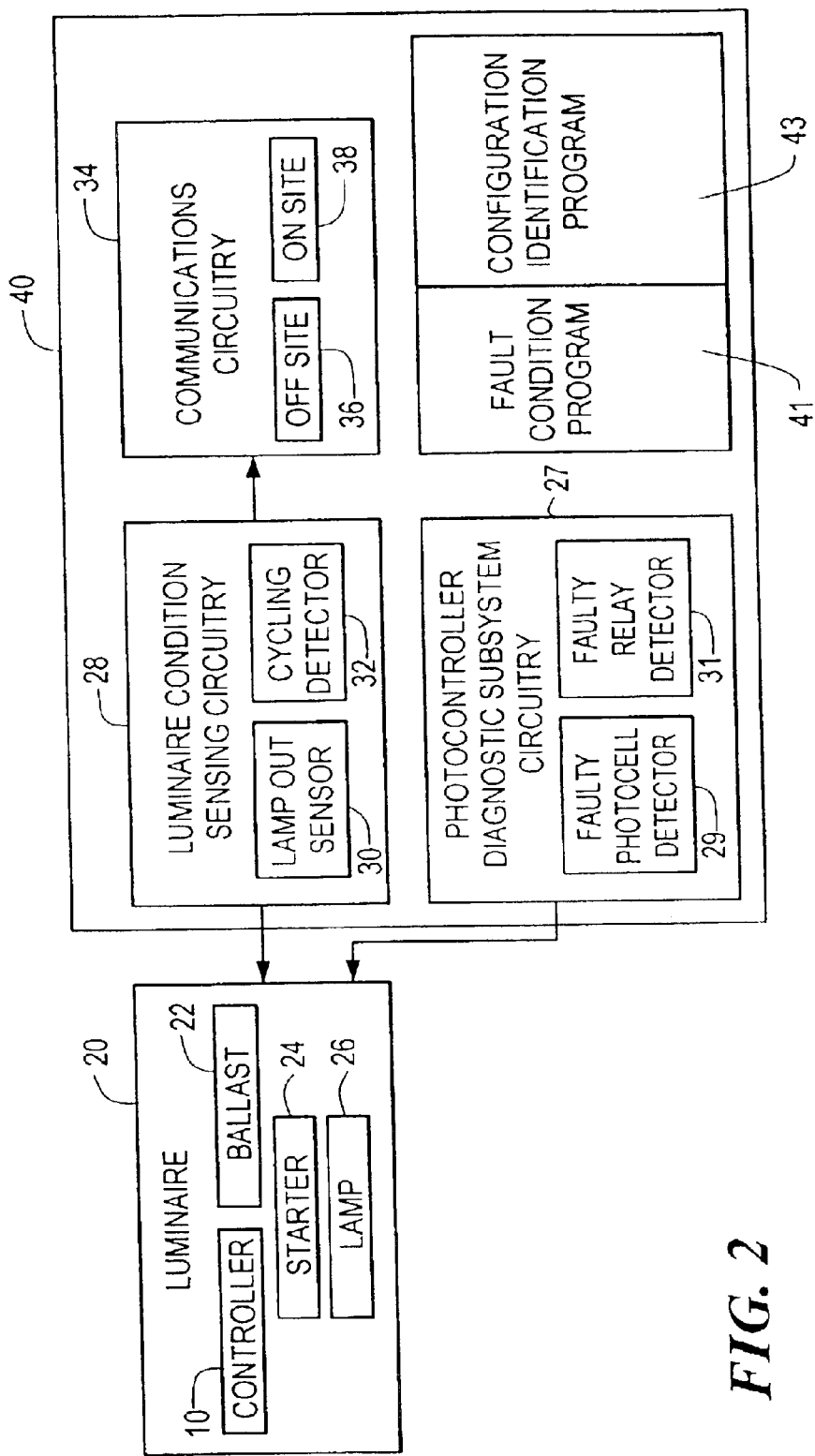
FIG. 2 is a block diagram showing the primary components associated with the photocontroller shown in FIG. 1.
Figure 3:
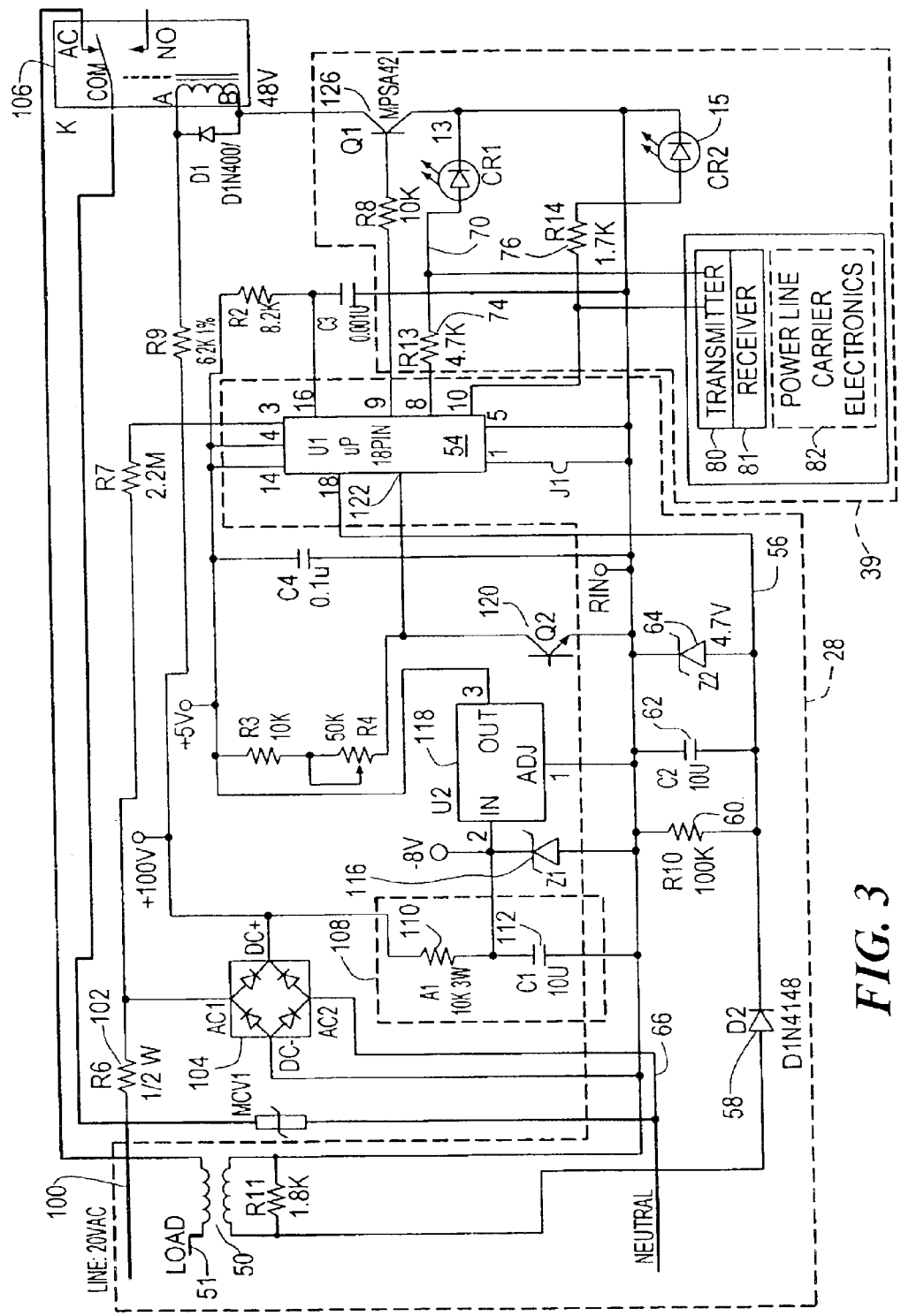
FIG. 3 is a wiring diagram showing the primary components associated with the photocontroller shown in FIG. 1.
Figure 10:
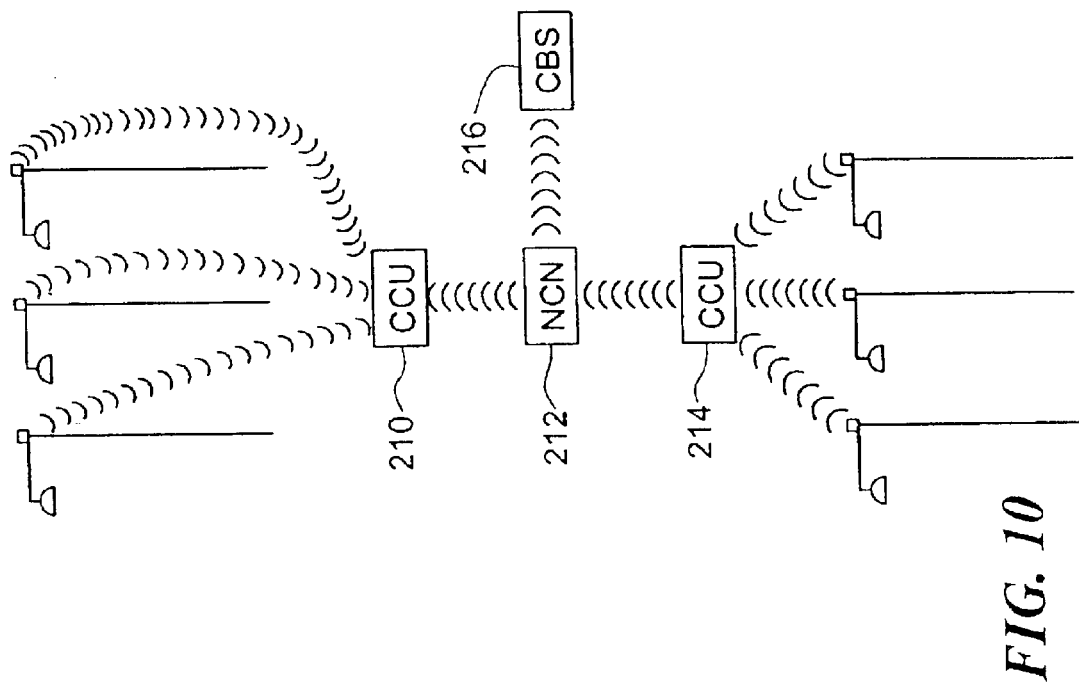
FIG. 10 is a schematic view showing another method of externally transmitting fault conditions in accordance with the subject invention.

The circuit board within cover 12 is configured to operate in accordance with the block diagram shown in FIG. 2 and, in one example, the specific circuit diagram shown in FIG. 3. Microcontroller 54 shown in the circuit diagram of FIG. 3 is programmed in accordance with the flow charts shown in FIGS. 4–8 in accordance with this invention, and transmitter 80 shown in the circuit diagram of FIG. 3 can be linked to a communications network or networks as shown in FIGS. 9 and 10 in accordance with this invention.

A standard street light type luminaire 20, FIG. 2, typically includes a controller such as controller 10, FIG. 1, ballast 22, starter or igniter 24, and a HPS or other type of lamp 26. Lamp 26 is more generally referred to as an electrical device or load.

Microcontroller 54, FIG. 3 includes fault condition detection programing such as photocontroller diagnostic subsystem circuitry 27, FIG. 2 and luminaire condition sensing circuitry 28 in accordance with this invention which may be integral with photocontroller 10, FIG. 1. Photocontroller diagnostic subsystem circuitry 27, FIG. 2 includes faulty photocell detector 29 and faulty relay detector 31. Luminaire condition sensing circuitry 28 includes lamp out sensor circuitry 30 and cycling detector circuitry 32. In the preferred embodiment, faulty photocell detector 29, faulty relay detector 31, lamp out sensor circuitry 30, and cycling detector circuitry 32 all uniquely share the same electronic components discussed with reference to FIG. 3. Faulty photocell detector 29 and faulty relay detector 31 operate, in the preferred embodiment, as means for verifying the operability of the relay of the photocontroller and also the operability of the light sensor, typically a photocell, of the photocontroller. There are also means for sensing a condition of luminaire 20 such as a lamp out condition or a cycling condition, namely luminaire condition sensing circuitry 28.

Thus, the microprocessor can detect a faulty photocell, a faulty relay, a lamp out condition, and a lamp cycling condition. In each case when such a fault is detected, an indication is provided via communication circuitry 34 off site or onsite as shown at 38, to, for example, illuminate LEDs 13 and/or 15, FIG. 1.

In one configuration, microprocessor 54, FIG. 3 is programmed to detect a cycling event via cycling detection circuitry 32, FIG. 2 according to one of three possible embodiments or configurations. For example, some customers want the light to turn off immediately upon the detection of a cycling fault and the LED resident on the photocontroller to flash. This programming option is called "option A", 195, FIG. 6, as discussed in the Background section above. Other customers, when a cycling fault is detected, want the light to remain on even in the daytime so it can be readily seen by repair personnel. This "cycling day burner" option is programmed in the microprocessor as "option B", 196, FIG. 6. Still other customers, when a cycling fault is detected, ask that the light be turned off and kept off always thereafter. This is "option C" programming, 197, FIG. 6.

As also delineated in the Background section above, one interesting concern that occurred when photocontrollers were programmed to according to these different options is that quality assurance inspectors had a difficult time assuring at the factory that the correct programming option is resident in the microprocessor of the photocontroller under test. Still another interesting problem occurred in that the microprocessor was programmed to provide a fault signal only when there was a fault i.e., there was no way to quickly and positively ascertain whether the photocontroller was operating properly at factory testing. Moreover, it took some time for the transients to settle and the lamp to warm up thereby adding to the cost of and time consumed by final product testing.

Thus, in this invention, microprocessor 54, FIG. 3 also includes fault condition programming 41, FIG. 2 which detects a fault condition based on the load drawn by the lamp (detected by transformer 50, FIG. 3) and configuration identification program 43, FIG. 2 which provides an indication of a fault according to one of the above configurations (or others). Microprocessor 54, FIG. 3, however, is also programmed to output a signal indicative of a no-fault detected condition and in a way that conveys to the quality assurance inspector the configuration of the particular microprocessor on board the photocontroller.

In this way, final product testing is faster, there is a positive indication when a fault is detected, and, also, quality assurance personnel are informed as to which fault indication configuration is resident on the microprocessor of the photocontroller.

In one example, if no fault is detected, LED 13 flashes the Morse code for the letter configuration programming option A, B, or C discussed above with reference to FIG. 6.

Also a part of the present invention are transmitter means such as communication circuitry 34 which may include off-site remote communications subsystem 36 and/or on-site communications subsystem 38 which may simply be visual indicator means such as LED 13, FIG. 1 of one color for indicating the occurrence of a cycling condition or a faulty photocell condition and LED 15 of another color for indicating the occurrence of a lamp out condition or a faulty relay condition. The LED's may also be made to flash to indicate a faulty photocontroller and be steady on to indicate a cycling or lamp out condition As discussed above, one of the LEDs, during final product testing, flashes the Morse code for the letter configuration programming option A, B, or C when no fault is detected at final product testing. If the LEDs do not flash at all, a fault of some type is present as discussed infra.

Off-site communication circuitry 36 may also be implemented to transmit these and other conditions to a remote location for real time diagnostics as discussed infra.

Thus, luminaire diagnostic system 40, FIG. 2 which includes condition sensing circuitry 28, diagnostic circuitry 27, fault condition program 41, configuration identification program 43, and communication circuitry 34 eliminates the guess work involved, especially in the day time, when repair personnel attempt to determine which street light and/or a photocontroller has a faulty component. The cost of servicing streetlights is severely reduced in part because the guess work of on-site diagnoses of problems with the street light systems is eliminated.

Photocontroller diagnostic subsystem circuitry 27, luminaire condition sensing circuitry 28, fault condition program 41, and configuration identification program 43 include means for detecting the load drawn by the lamp such as transformer 50, FIG. 3 coupled to load line 51 and connected to microprocessor 54 via line 56. A hall effect sensor could also be used as it is functionally equivalent to transformer 50. Diode 58 is located on line 56 to rectify the current from transformer 50. Resistor 60, capacitor 62, and Zener diode 64 are connected across line 56 and neutral line 66 to filter and stabilize the current. Capacitor 62 filters the rectified AC current present on line 56 and typically has a value of 10 $\mu$F. Resistor 60 has a typical value of 100 k$\Omega$ and acts as a bleeder for capacitor 62. Zener diode 64 acts to limit the voltage to microprocessor 54 and has a typical value of 4.7 volts at one Watt. Microprocessor 54 then transmits signals over lines 70 and 72 through resistors 74 and 76 which limit the current output current (typical values are 4.7 k$\Omega$) to LEDs 13 and 15, respectively.

Alternatively, or in addition, transmitter 80 may be connected to microprocessor 54 and used to transmit signals indicative of photocontroller and/or lamp conditions sensed by photocontroller diagnostic circuitry and sensing circuitry 28 to a remote location as discussed infra via RF communications. Alternatively, such communication signals may be placed back on the power line to which the lamp is connected via power line carrier electronics package 82. Microprocessor 54 is preferably an 18 pin microprocessor part no. PIC16C710 or an eight pin PIC12C671 with an analog to digital converter capability available from Microchip.

Much of the remainder of the circuitry shown in FIG. 3 is described in general in U.S. Pat. No. 5,195,016 incorporated herein by this reference. Specifically, 120 volt AC line 100 is fed to resistor 102 (1 k$\Omega$) which is used to limit the current to bridge rectifier 104. Bridge rectifier 104 rectifies the AC current to a rippled 100 VDC presented to relay 106 and resistor/capacitor filter network 108. Resistor 110 has a typical value of 10 k$\Omega$ and capacitor 112 has a typical value of 10 $\mu$F. RC filter network 108 filters the rippled DC signal to a smooth DC signal and Zener diode 116 clamps the voltage at 8 volts DC. Regulator 118 receives this 8 volt VDC signal and maintains a constant 5 volt DC signal to microprocessor 54. When light is sensed by the sensor, e.g., photocell 120, the voltage level on pin 1, 122 of microprocessor 54 will vary inversely with the light level. When the light level is high (daylight) the voltage is low and when the light level is low (night time) the voltage is high. Program variables in the programming of microprocessor 54 make it possible to select what light level will turn on switch 126 which in turn energizes relay 106 and also the light level which will turn off switch 126 which in turn de-energizes relay 106.

Figure 4:
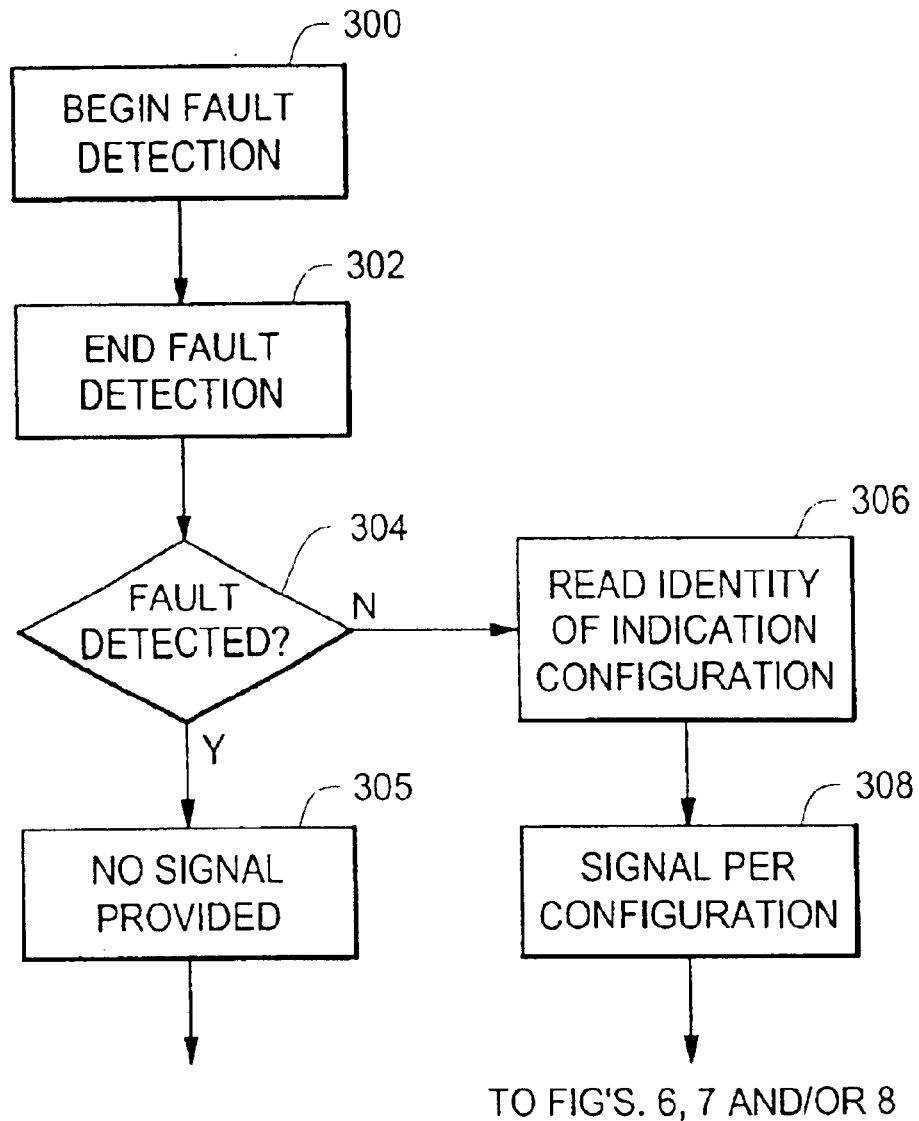
FIG. 4 is a flow chart depicting the basic steps performed by the microprocessor of the photocontroller shown in FIG. 1 during factory testing.

Microprocessor 54, FIG. 3 is programmed according to fault condition program 41, FIG. 2 to begin fault detection, step 300, FIG. 4 and end fault detection, step 302, and then only if no fault is detected, step 304, is configuration identification program 43, FIG. 2 invoked whereupon the identity of the programming of cycling detector 32, FIG. 2 is read, step 306, FIG. 4 and a signal output is provided, step 308, to, for example, cause LED 13, FIG. 1 to blink the Morse code for the letter configuration of the cycling detector program as discussed above. Programming then proceeds to FIG. 6, 7, and/or 8 as discussed below.

If a fault is detected at step 304, FIG. 4, no output is provided as shown at 305 thereby informing quality assurance personnel at the factory that current transformer 50, FIG. 3 may be faulty, ballast 22, FIG. 2 is open, lamp 26 is defective, starting aid 24 is defective, power is not being supplied to luminaire 20 and/or photocontrol 10, FIG. 1 is faulty in some manner. Corrective action is then taken.

Figure 5:
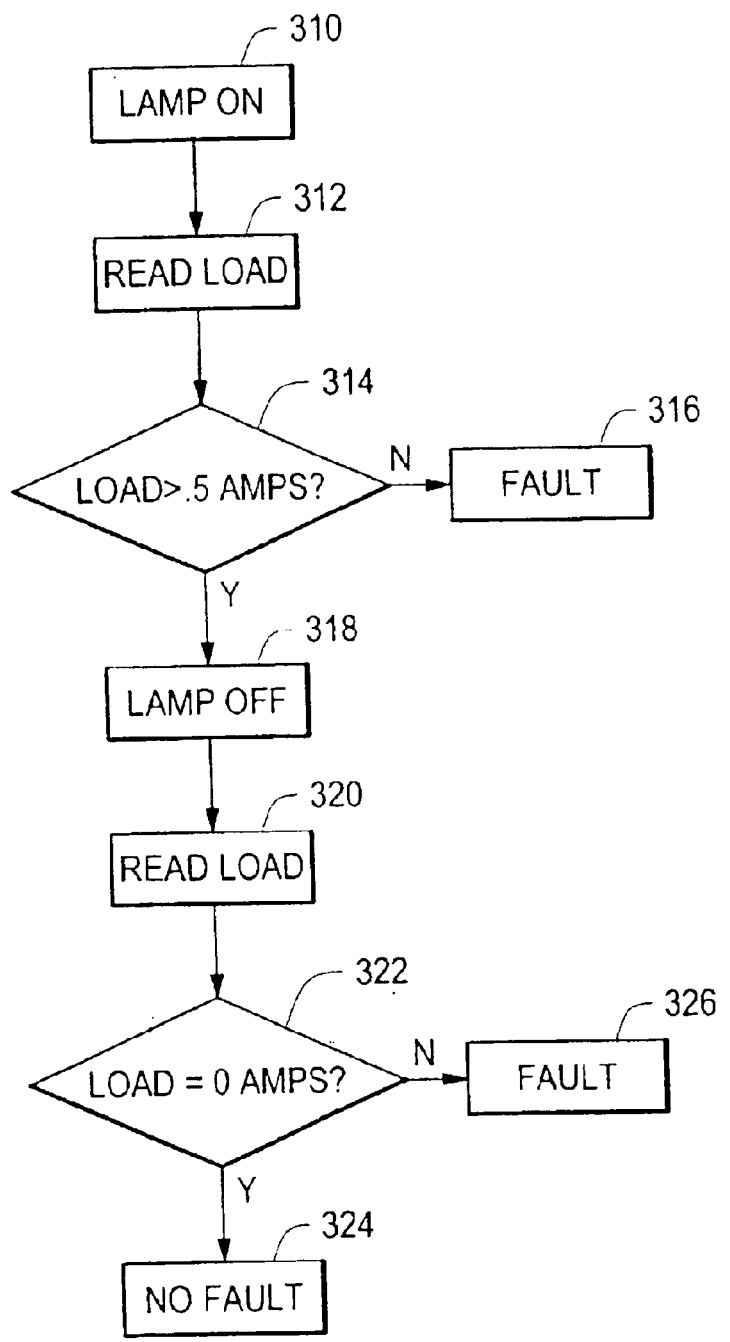
FIG. 5 is a more detailed flow chart showing the programming associated with the microprocessor of the photocontroller shown in FIG. 1 to detect two possible fault conditions.

Fault condition program 41, FIG. 2, in one example, operates when power is first supplied to lamp 26, FIG. 2, step 310, FIG. 5. This can be accomplished by plugging photocontrol 10, FIG. 1 into a test lamp fixture for final testing before shipment. The load detected by transformer

50, FIG. 3 is then read by microprocessor 54, step 312, FIG. 5. The fault condition program 41, FIG. 2 then determines whether the load is greater than a predetermined threshold (e.g., 0.5 amps), step 314, FIG. 5. If the load is not greater than this threshold, a fault condition is present as shown at step 316 (see also steps 304 and 305, FIG. 4). Next, quality assurance personnel or the lineman (if this testing is carried out at the top of the street lamp pole) covers window 14, FIG. 1 of photocontrol 10 and the lamp should turn off step 318, FIG. 5. Again, fault condition program 41, FIG. 2 resident on microprocessor 54, FIG. 3 in conjunction with transformer 50 reads the load on the lamp, step 320, FIG. 5.

If the load is less than a predetermined threshold or is preferably zero amps, step 322, no fault is detected, step 324 whereupon steps 306 and 308, FIG. 4 are carried out. If the load is not zero amps, a fault is detected as shown at step 326 and no output signal is provided again providing quality assurance personnel and also a lineman with a positive indication that current transformer 50, FIG. 3 is faulty, ballast 22, FIG. 2 is open, lamp 26 is defective, starting aid 24 is defective, power is not being supplied to luminaire 20 and/or photocontroller is faulty. Again, corrective action is then taken.

Thus, microprocessor 54, FIG. 3 is programmed to output the Morse code signal indicative of the indication configuration only when both the load drawn by the lamp is greater than a predetermined threshold when the lamp is on and also is less than a predetermined threshold when the lamp is off. When both of these conditions are present, step 306, FIG. 4, the indication configuration (A, B, or C—See 195, 196, and 197, FIG. 6) is read, and LED 13, FIG. 1 flashes the Morse code for the appropriate letter configuration.

Microprocessor 54 also predicts a lamp out and/or lamp cycling condition in accordance with the programming described with reference to FIGS. 6 and 7 and predicts a faulty photocontroller relay and/or a faulty photocontroller photocell in accordance with the programming described with reference to FIG. 8.

Figure 6:
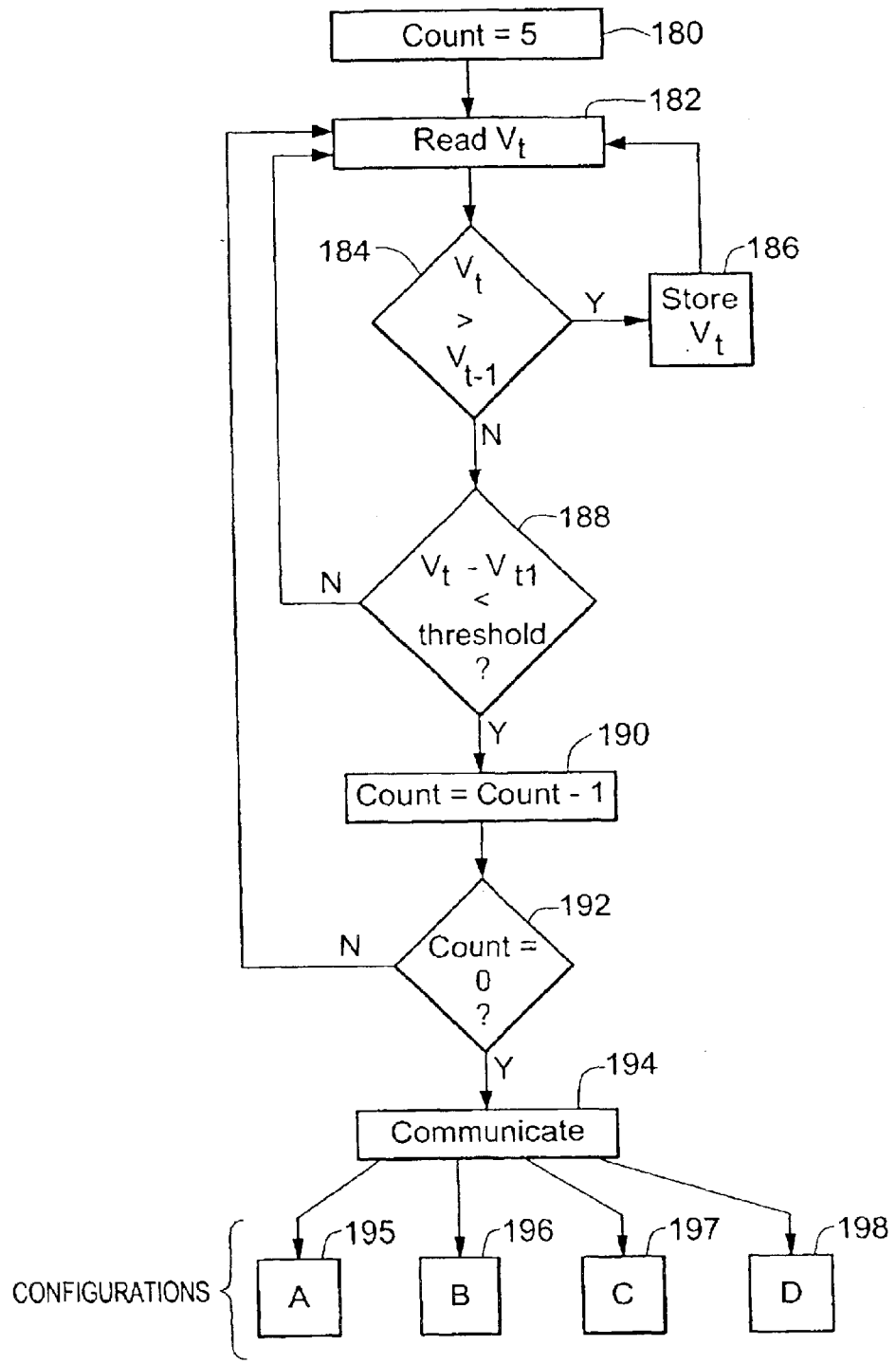
FIG. 6 is a flow chart depicting the routine for detecting a cycling event in accordance with the subject invention.

Microprocessor 54, FIG. 3, includes the cycling detection routine shown in FIG. 6 wherein the count representing the number of cycles is set to a number such as five upon initialization, step 180, and then the voltage on line 56, FIG. 3, is read periodically at a time t such as every second, step 182, FIG. 6. If a subsequent voltage reading is greater than a previous voltage reading, step 184, the subsequent voltage reading is stored and used as the base line, step 186. This voltage level is stored in a buffer as a bench mark so that any transients and any voltage levels read during the warm up period will be accounted for. Processing then continues until a subsequent voltage reading is lower than a previous voltage reading, step 188, by some predetermined threshold, for example, 25%, which indicates the presence of a cycling event. The 25% threshold could be as low as 12%, but a 12% variation could also be indicative of a power surge and so the 25% threshold is preferred. The count is then decremented, step 190, and once the count reaches some predetermined minimum, step 192, for example, 0, the fact that a cycling event has occurred is communicated, step 194, in a fashion similar to the actions taken after step 158, FIG. 7. The lamp can be turned off permanently or the microprocessor can be programmed to turn the lamp off only for one night and then re-set to again detect cycling the next night to prevent erroneous cycling detection events. In addition, or alternatively, LEDs 13 or 15, FIG. 1 can be made to flash, and/or a signal can be sent via transmitter 80 to a remote location to indicate the occurrence of a cycling event. An audible alarm could also be used.

Typically, the communication configurations as shown in FIG. 6 include option A, 195; option B, 196; option C, 197 and also possibly option D, 198 and other options as discussed above. As made clear above, each microprocessor is internally identified by one of these codes which is read in step 306, FIG. 4 in order to output a signal indicative of the specific configuration at step 308 either at the factory or during testing by a lineman.

Figure 7:
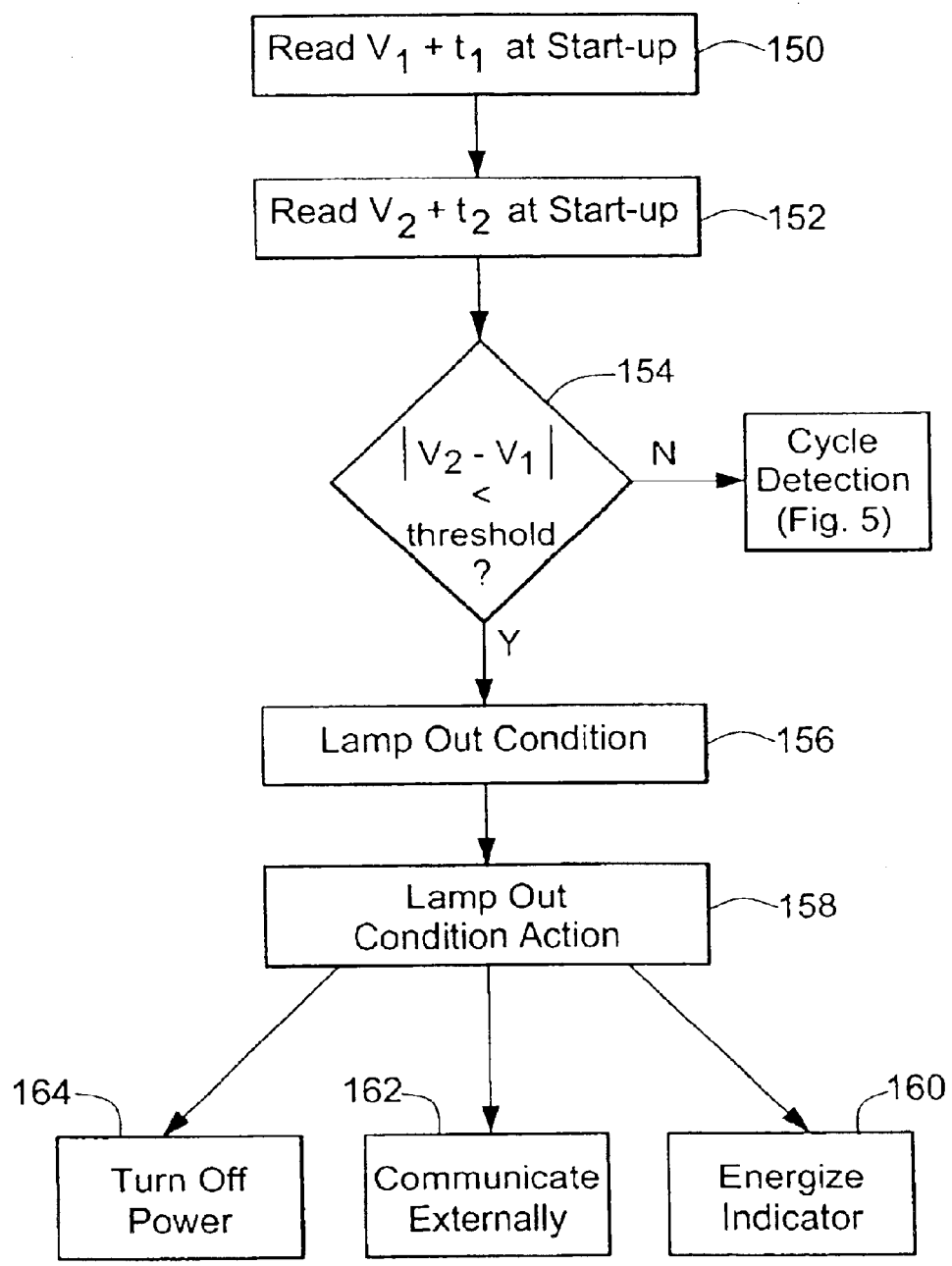
FIG. 7 is a flow chart showing the routine for detecting a lamp out condition in accordance with the subject invention.

Another routine, called a lamp out detection routine, begins by reading the voltage level on line 56, FIG. 3 at some time $t_1$ after the lamp is first turned on, step 150, FIG. 7. $t_1$ is typically about 2 seconds which is sufficient time to eliminate any transients in the circuitry. At some time later, $t_2$, typically 3 minutes, the voltage is again read, step 152, and these two voltages are compared to determine whether they are lower than a preset threshold, step 154, typically about 12.5 percent. If the difference between the two different voltage level readings is greater than this threshold, processing transfers to the cycle detection mode discussed with reference to FIG. 6. If, however, on the other hand, the difference between the two different voltage readings is less than this threshold, this is indicative of a lamp out condition, step 156, FIG. 7.

In other words, a properly working lamp consistently draws more and more of a load during the start up mode while a failed lamp or ballast does not. The threshold level for the comparison at step 154 could be zero but the 12.5 percent level is preferably used because the power correction capacitor used in the luminaire often draws a load even when the lamp is out but it always draws a constant load over time. Once microprocessor 54, FIG. 3, determines a lamp out condition, step 156, FIG. 7, it can take any number of lamp out condition actions, step 158, such as energizing LED 15, FIGS. 1 and 3, step 160, FIG. 7, provide a signal to transmitter 80, FIG. 3 to communicate to a remote base station, step 162, FIG. 7, and/or turning the power off to the lamp, step 164, to save energy and the life of the starting aid and ballast. Receiver 81, FIG. 3 may be used as a means to activate certain routines programmed in microprocessor 54, FIG. 3 including a routine to power the lamp in daylight hours for daytime testing.

In general, the photocontroller diagnostic section 27, FIG. 2 of the program is written to allow detection of photocontroller component failures. The operability of two components that the program can detect are typically photocell 120, FIG. 3 and relay 106. A faulty relay condition is defined as the current being drawn by the lamp during a certain ambient light condition, typically daylight or a day. In other cases, such as for golf course water fountains, the ambient light condition is night. A faulty photocell condition is defined by twenty-four hours of continuous daytime and nighttime lamp operation.

Figure 8:
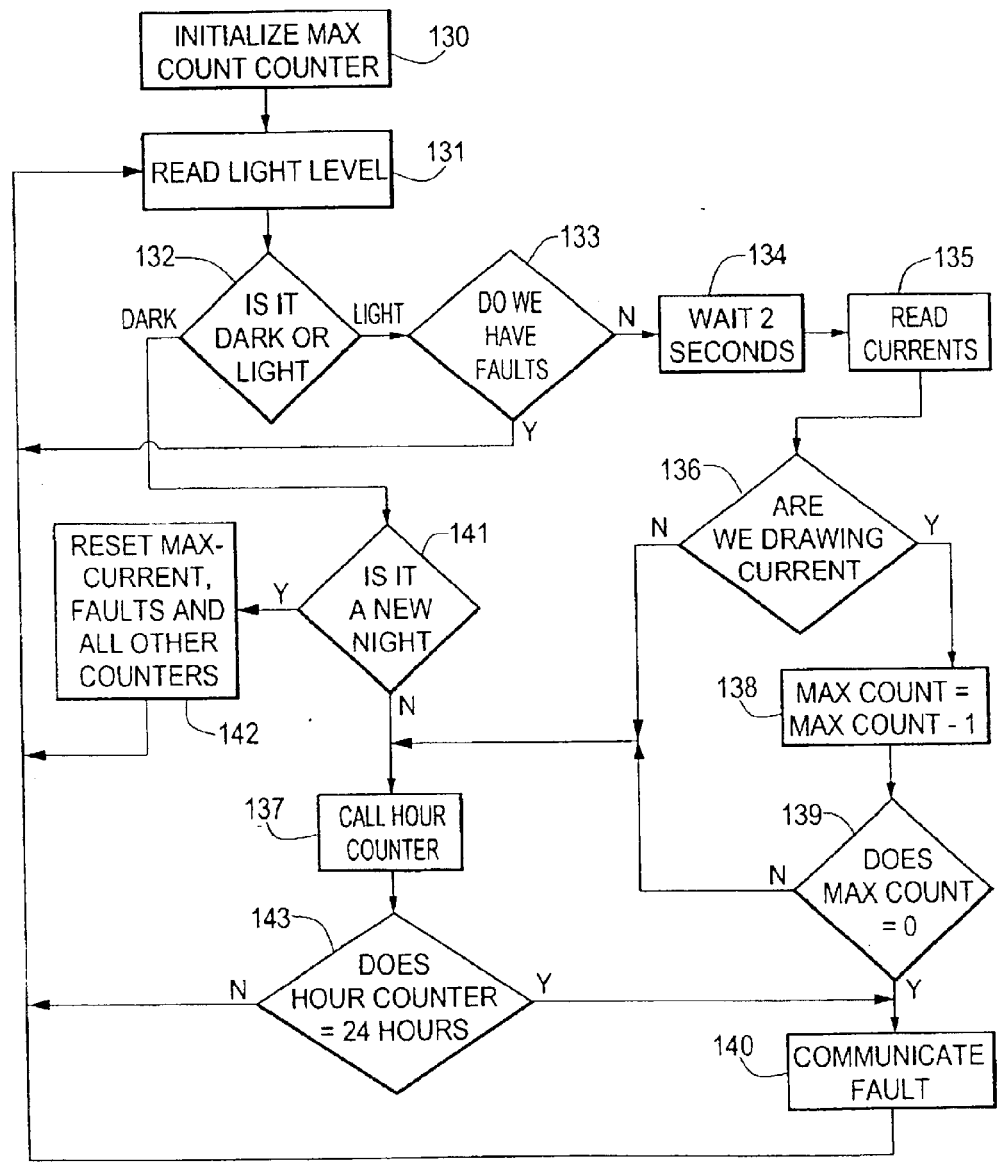
FIG. 8 is a flow chart depicting the routine for detecting a photocontroller fault in accordance with the subject invention.
Figure 9:
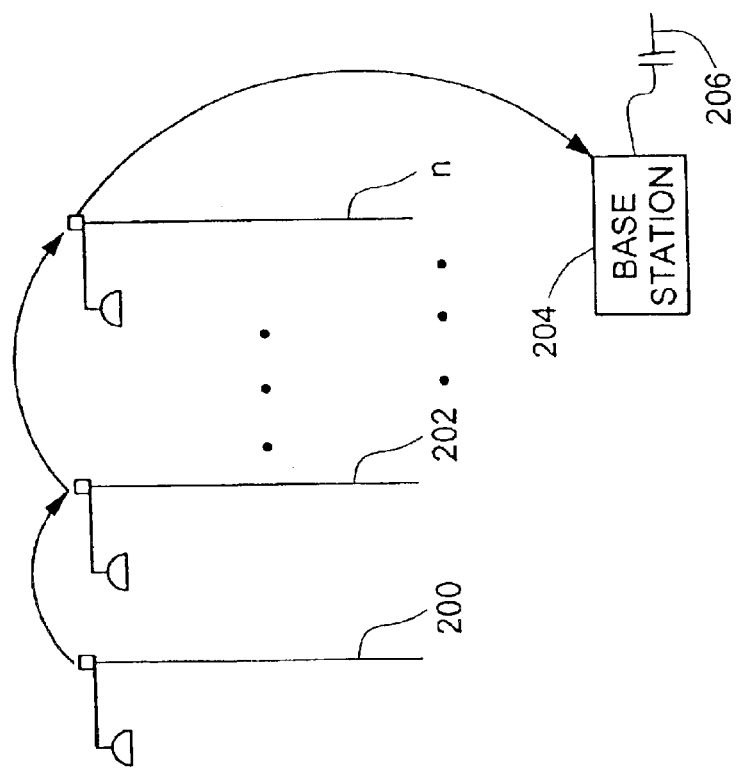
FIG. 9 is a schematic view showing one method of externally transmitting fault conditions in accordance with the subject invention.

When power is first applied to the photocontroller, initialization step 130, FIG. 8 sets all counters. The light level is then read every 0.5 seconds in step 131. The light level read is compared to a predetermined level and a decision is made whether it is light or dark, step 132. If it is light, the next question is whether a fault has already been detected, step 133. If so, the program will go back and check light level again. If no fault has previously been detected, then the program will wait two-seconds, step 134, and then read the current, step 135. The program will then check to see if there is a current draw, step 136. If no current is drawn, then the relay is properly operating since there should be no current drawn during daylight hours. Next, the program will call the hour counter, step 137. If current is drawn, then there is a problem and one second is subtracted from the counter, step 138 and a check is made to see if hour counter is at zero, step 139. If the hour count is not zero, then the program proceeds to step 137 to call the hour counter. If the hour count is zero, then the relay is faulty, a condition which is communicated via a relay fault signal, step 140 to LED's 13 and/or 15, FIG. 1. In addition, or alternatively, the relay fault signal could be transmitted to a remote location as discussed with reference to FIGS. 6–7.

If, in step 132, FIG. 8 it was determined that it was night, the program would next determine if it was a new night, step 141. If it is a new night, then all faults and counter and timers are reset, step 142. The program then goes on to check the light level again step 131.

If it is not a new night, then the hour counter is called, step 137. This hour counter is used to count the length of the night or day. If in step 143 it is determined that the hour counter is equal to a preset threshold, e.g., twenty-four hours, then the photocell is faulty. The program then communicates this fault, step 140 and causes LEDs 13 and/or 15, FIG. 1, to energize. Again, this faulty photocell signal could also or alternatively be communicated to a remote location as discussed below with reference to FIGS. 6–7. If the hour counter in step 143, FIG. 8 is not equal to twenty-four hours, then the light level is checked again, step 131.

External communications may occur via RF transmission or via powerline carrier technology as shown in FIG. 9 from street light 200 to street light 202 to street light, whereupon the condition information is sent to final or intermediate base station 204 and, if required, to other base stations or other locations as shown at 206 in any number of ways including satellite transmission, RF transmissions, land line transmissions, and the like. Alternatively, as shown in FIG. 10, a communication network utilizing RF transmitters and/or transmitter receivers can be used wherein one set of transmitters resident on the photocontrollers described above transit to communication control unit 210 which in turn communicates to network control node 212 which also receives communications from communication control unit 214. Network control node 212 then communicates with central base station 216 as is known in the art of remote meter reading technology. In this way, information regarding the operability of the photocontroller (faulty relay, faulty photocell) and/or the luminaire (a cycling condition, faulty lamp) can be transmitted to remote locations for real time diagnostics.

Note, however, that in one embodiment, such remote communication capabilities are not required and LEDs 13 and 15, FIGS. 1 and 3, can be the only indicators in an less expensive, less complex photocontroller in accordance with the subject invention. Note also that other types of visual and even non-visual alarm indicators could be used instead of LEDs 13 and 15. Also, additional LEDs could be used such that one signals the occurrence of a faulty relay, one signals the presence of a faulty photocell, one signals the presence of a cycling condition, and one signals a faulty lamp condition. One LED also outputs the Morse code of the microprocessor's programming configuration as discussed with reference to FIGS. 4–5 when no fault is detected at the factory or on the lamp pole.

Thus, photocontroller 10, FIG. 1, includes sensor 120, FIG. 3 which, in combination with microprocessor 54 and the circuitry shown in FIG. 3 determines the presence of daylight. Relay means, such as relay 106, is responsive to sensor 120 via microprocessor 54, de-energizes luminaire 20, FIG. 2 during periods of daylight and energizes lamp 20 during periods of darkness. In other embodiments, such as golf course water fountains, the reverse is true and thus microprocessor 54 is programmed to turn the fountain on during the day and off at night. The relay means could also be a TRIAC, FET or other sold state device.

The diagnostic subsystem of this invention includes two primary components: a photocontroller diagnostic routine and a luminaire diagnostic route. Microprocessor 54, FIG. 3 is programmed in accordance with steps 130–143, FIG. 8 to verify the operability of relay 106, FIG. 3 and sensor 120, (typically a photocell), and to then transmit a signal representing a failure of either component. A faulty relay is usually detected by determining whether current is drawn by the lamp during daylight hours. A faulty photocell is usually detected by determining whether the lamp remains on or off for a preestablished time period, e.g., 24 hours.

The luminaire diagnostic routine operates in accordance with the processing steps shown in FIGS. 6 and 7. Transformer 50, FIG. 3 is used, in combination with microprocessor 54 to detect the load drawn by the lamp. This information is used both by the photocontroller diagnostic routine and the luminaire diagnostic routine.

The subject invention also provides a luminaire diagnostic and configuration identification system as discussed with reference to FIGS. 2 and 4–5. Such a system is easier and faster to inspect. Microprocessor 54, FIG. 3 is programmed according to the flowcharts of FIGS. 4 and 5 to output a positive indication when no fault is detected in the photocontrol in a manner that provides a positive indication to quality assurance personnel regarding the particular microprocessor configuration resident in the photocontroller (e.g., programming options A, B, or C as shown in FIG. 6).

The invention results from the realization that a faster and easier to inspect photocontrol 10, FIGS. 1–2 can be effected by programming microprocessor 54, FIG. 3 of the photocontrol to quickly detect a fault condition based on the load drawn by the lamp and then to provide a positive indication when no fault is detected in a way that also informs quality assurance personnel which fault indication program version is resident on the microprocessor of the photocontrol as shown at 41 and 43, FIG. 2 and in FIGS. 4–5.

Although specific features of the invention are shown in some drawings and not in others, this is for convenience only as each feature may be combined with any or all the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims. In one example, microprocessor 54, FIG. 3 could be located in a unit which plugs into the lamp fixture much like a standard photocontrol and then the photocontrol shown in FIG. 1 plugs into that unit. Exemplary programming code for fault condition program 41, FIG. 2 and configuration identification program 43 is attached hereto as appendix A.

What is claimed is:

1. A diagnostic and configuration identification system comprising:

an electrical device;

a photocontroller for automatically turning the electrical device on and off in response to ambient light levels;

a detector for sensing the load drawn by the electrical device when it is on; and a processor responsive to the load drawn by the electrical device when it is on and programmed to:

detect a fault condition based on the load drawn by the electrical device and to provide an indication of said fault condition according to one of a plurality of configurations, when no fault condition is detected, to determine the configuration of the processor, and then output a signal indicative of the indicated configuration.

2. The system of claim 1 in which the configuration is uniquely identified and the processor reads the identity to determine the configuration.

3. The system of claim 1 in which one said configuration includes a routine which turns the electrical device off when a fault condition is detected, the photocontroller also including a light turned on by the processor when a fault condition is detected.

4. The system of claim 1 in which one said configuration includes a routine which permanently turns the electrical device on when a fault condition is detected.

5. The system of claim 1 in which one said configuration includes a routine which permanently turns the electrical device off when a fault condition is detected.

6. The system of claim 1 in which the fault condition programming determines whether the load drawn by the electrical device is greater than a predetermined threshold when the electrical device is on and also determines whether the load drawn by the electrical device when the electrical device is off is less than the predetermined threshold.

7. The system of claim 6 in which the processor outputs a signal indicative of the identified configuration only when both the load drawn by the electrical device is greater than a predetermined threshold when the electrical device is on and when the load drawn by the electrical device when the electrical device is off is less than a predetermined threshold.

8. The system of claim 1 in which the fault condition programing further detects the load drawn by the electrical device when the electrical device is on at times $t_1$ and $t_2$, calculates the load difference, determines whether the load difference exceeds a predetermined threshold, and provides an indication of a fault condition according to one said configuration when the load difference exceeds the predetermined threshold.

9. The system of claim 8 in which the fault condition programming further counts the number of times the load difference exceeds the predetermined threshold and provides an indication of a fault condition according to one said configuration when the count exceeds a predetermined threshold.

10. The system of claim 1 in which the fault condition programming further detects whether the load is drawn by the electrical device when it is off and provides an indication of a fault condition according to a said configuration when a load is drawn by the electrical device when it is off.

11. The system of claim 1 in which the fault condition programming further detects whether the electrical device remains continuously on or off for greater a predetermined time threshold and provides an indication of a fault condition according to one said configuration in response.

12. The system of claim 1 in which the microprocessor and the detector are integral with the photocontroller.

13. The system of claim 1 in which the electrical device is a street lamp.

14. A diagnostic and configuration identification system comprising:

an electrical device;

a photocontroller for automatically turning the electrical device on and off in response to ambient light levels; and a processor programmed to detect a fault condition and provide an indication of said fault condition according to one of a plurality of configurations, and, when no fault condition is detected, to output a signal indicative of the indicated configuration.

15. The system of claim 14 further including a detector for sensing the load drawn by the electrical device when it is on and wherein the processor is responsive to the load drawn by the electrical device when it is on.

16. The system of claim 14 in which each configuration is uniquely identified and the processor reads the identity to determine the configuration.

17. The system of claim 14 in which one said configuration includes a routine which turns the electrical device off, the photocontroller also including a light turned on by the processor when a fault condition is detected.

18. The system of claim 14 in which one said configuration includes a routine which permanently turns the electrical device on when a fault condition is detected.

19. The system of claim 14 in which one said configuration includes a routine which permanently turns the electrical device off when a fault condition is detected.

20. The system of claim 14 in which the fault condition programming determines whether the load drawn by the electrical device is greater than a predetermined threshold when the electrical device is on and determines whether the load drawn by the electrical device when the electrical device is off is less than the predetermined threshold.

21. The system of claim 20 in which the processor outputs a signal indicative of the configuration only when both the load drawn by the electrical device is greater than a predetermined threshold when the electrical device is on and when the load drawn by the electrical device when the electrical device is off is less than a predetermined threshold.

22. The system of claim 14 in which the fault condition programming further detects the load drawn by the electrical device when the electrical device is on at times $t_1$ and $t_2$, calculates the load difference, determines whether the load difference exceeds a predetermined threshold, and provides an indication of a fault condition according to one said configuration when the load difference exceeds the predetermined threshold.

23. The system of claim 22 in which the fault condition programming further counts the number of times the load difference exceeds the predetermined threshold and provides an indication of a fault condition according to one said configuration when the count exceeds a predetermined threshold.

24. The system of claim 14 in which the fault condition programming further detects whether the load is drawn by the electrical device when it is off and provides an indication of a fault condition according to a said configuration when a load is drawn by the electrical device when it is off.

25. The system of claim 14 in which the fault condition programming further detects whether the electrical device remains continuously on or off for greater a predetermined time threshold and provides an indication of a fault condition according to one said configuration in response.

26. The system of claim 14 in which the microprocessor and the detector are integral with the photocontroller.

27. The system of claim 14 in which the electrical device is a lamp.

28. A diagnostic and configuration identification system comprising:

an electrical device;

a photocontroller for automatically tuning the electrical device on and off in response to ambient light levels;

a detector for sensing the load drawn by the electrical device when it is on; and a processor responsive to the load drawn by the electrical device when it is on and programmed to:
  detect a fault condition based on the load drawn by the electrical device, and
  when no fault condition is detected, to output a signal in response.

29. The system of claim 28 in which the processor is further programmed to detect whether the load drawn by the electrical device is greater than a predetermined threshold when the electrical device is on and detects whether the load drawn by the electrical device when the electrical device is off is less than a predetermined threshold.

30. The system of claim 28 in which the processor is further programmed to provide an indication of a fault condition according one of a plurality of configurations and, when no fault condition is detected during testing, to identify the specific programming configuration of the processor.

31. The system of claim 30 in which each configuration is uniquely identified and the processor reads the identity to determine the configuration.

32. The system of claim 30 in which one said configuration includes a routine which turns the electrical device off, the photocontroller also including a light turned on by the processor when a fault condition is detected.

33. The system of claim 30 in which one said configuration includes a routine which permanently turns the electrical device on when a fault condition is detected.

34. The system of claim 30 in which one said configuration includes a routine which permanently turns the electrical device off when a fault condition is detected.

35. The system of claim 28 in which the processor is programmed to determine whether the load drawn by the electrical device is greater than a predetermined threshold when the electrical device is on and determines whether the load drawn by the electrical device when the electrical device is off is less than the predetermined threshold.

36. The system of claim 35 in which the processor outputs a signal during testing only when both the load drawn by the electrical device is greater than a predetermined threshold when the electrical device is on and when the load drawn by the electrical device when the electrical device is off is less than a predetermined threshold.

37. A luminaire diagnostic and configuration identification system comprising:
  a photocontroller for automatically turning a lamp on and off in response to ambient light levels;
  a detector for sensing the load drawn by the lamp when it is on; and
  a processor, inside the photocontroller or coupled thereto and responsive to the load drawn by the lamp when it is on, programmed to:
    detect a fault condition based on the load drawn by the lamp by detecting whether the load drawn by the lamp is greater than a predetermined threshold when the lamp is on and whether the load drawn by the lamp when it is off is less than the predetermined threshold,
    provide an indication of a fault condition according to one of a plurality of configurations, and
    when no fault condition is detected, to determine the configuration and then output a code indicative of the indicated configuration.

38. The system of claim 37 in which each configuration is uniquely identified and the processor reads the identity to determine the configuration.

39. The system of claim 37 in which one said configuration includes a routine which turns the lamp off, the photocontroller also including a light turned on by the processor when a fault condition is detected.

40. The system of claim 37 in which one said configuration includes a routine which permanently turns the lamp on when a fault condition is detected.

41. The system of claim 37 in which one said configuration includes a routine which permanently turns the lamp off when a fault condition is detected.

42. The system of claim 37 in which the processor is programmed to determine whether the load drawn by the lamp is greater than a predetermined threshold when the lamp is on and to determine whether the load drawn by the lamp when the lamp is off is less than the predetermined threshold.

43. The system of claim 42 in which the processor outputs a code indicative of the configuration only when both the load drawn by the lamp is greater than a predetermined threshold when the lamp is on and when the load drawn by the lamp when the lamp is off is less than a predetermined threshold.

44. The system of claim 37 in which the processor is programmed to detect the load drawn by the lamp when the lamp is on at times $t_1$ and $t_2$, calculate the load difference, determine whether the load difference exceeds a predetermined threshold, and provide an indication of a fault condition according to one said configuration when the load difference exceeds the predetermined threshold.

45. The system of claim 44 in which the processor is programmed to count the number of times the load difference exceeds the predetermined threshold and provide an indication of a fault condition according to one said configuration when the count exceeds a predetermined threshold.

46. The system of claim 37 in which the processor is further programmed to detect whether a load is drawn by the lamp when it is off and to provide an indication of a fault condition according to a said configuration when a load is drawn by the lamp when it is off.

47. The system of claim 37 in which the processor is further programmed to detect whether the lamp remains continuously on or off for greater a predetermined time threshold and to provide an indication of a fault condition according to one said configuration in response.

48. The system of claim 37 in which the code is the Morse code for the fault condition.

49. A diagnostic and configuration identification system comprising:
  a lamp;
  a photocontroller for automatically turning the lamp on and off in response to ambient light levels;
  a detector for sensing the load drawn by the lamp when it is on; and
  a processor responsive to the load drawn by the lamp when it is on and configured to:
    detect a cycling condition based on the load drawn by the lamp and to provide an indication of said cycling condition according to one of a plurality of programming configurations, the processor further configured to detect other fault conditions and, when no fault condition is detected, to determine the programming configuration, and then output a signal indicative thereof.

* * * * *